US011162550B2

(12) United States Patent
    Morio

(10) Patent No.: US 11,162,550 B2
(45) Date of Patent: Nov. 2, 2021

(54) CALIPER FOR OPPOSED PISTON TYPE DISC BRAKE

(71) Applicant: AKEBONO BRAKE INDUSTRY CO., LTD., Tokyo (JP)

(72) Inventor: Takefumi Morio, Tokyo (JP)

(73) Assignee: AKEBONO BRAKE INDUSTRY CO., LTD., Tokyo (JP)

( * ) Notice: Subject to any disclaimer, the term of this patent is extended or adjusted under 35 U.S.C. 154(b) by 46 days.

(21) Appl. No.: 16/467,153

(22) PCT Filed: Dec. 7, 2017

(86) PCT No.: PCT/JP2017/044005
    § 371 (c)(1),
    (2) Date: Jun. 6, 2019

(87) PCT Pub. No.: WO2018/105694
    PCT Pub. Date: Jun. 14, 2018

(65) Prior Publication Data
    US 2019/0316641 A1    Oct. 17, 2019

(30) Foreign Application Priority Data

Dec. 9, 2016    (JP) .............................. JP2016-239006

(51) Int. Cl.
    *F16D 55/228*    (2006.01)
    *F16D 65/02*     (2006.01)
    *F16D 55/00*     (2006.01)

(52) U.S. Cl.
    CPC ........... *F16D 55/228* (2013.01); *F16D 65/02* (2013.01); *F16D 2055/002* (2013.01); *F16D 2250/0007* (2013.01)

(58) Field of Classification Search
    CPC ....... F16D 2055/0016; F16D 2055/002; F16D 2055/0091; F16D 55/228; F16D 55/32; F16D 65/0068; F16D 65/0075
    See application file for complete search history.

(56) References Cited

U.S. PATENT DOCUMENTS 5,620,063 A  *  4/1997  Smith ................... F16D 55/228
                                                188/240
6,722,476 B1 *  4/2004  Cornolti ............... F16D 55/228
                                                188/264 CC
(Continued)

FOREIGN PATENT DOCUMENTS

DE    2147751 A1 *  3/1973  ........... F16D 55/228
DE    4301684 A1 *  8/1994  ............ F16D 65/18
(Continued)

OTHER PUBLICATIONS

Extended European Search Report dated May 12, 2020 issued in European Patent Application No. 17877722.3.
(Continued)

*Primary Examiner* — Bradley T King
*Assistant Examiner* — Stephen M Bowes
(74) *Attorney, Agent, or Firm* — Faegre Drinker Biddle & Reath LLP

(57) ABSTRACT

A belt-like rib that extends in a peripheral direction is provided to the outer surface, in the axial direction, of an outer body. The inner diameter side sections of the bottoms of outer cylinders at the outer diameter side and the outer diameter side sections of the bottoms of outer cylinders at the inner diameter side, all the cylinders being provided to the outer body so as to be separated into two stages in the radial direction, are covered with the belt-like rib from outside in the axial direction so as to traverse along the peripheral direction. The outer diameter side sections of the bottoms of the outer cylinders at the outer diameter side and (Continued)

the inner diameter side sections of the bottoms of the outer cylinders at the inner diameter side are made to protrude from the belt-like rib in the radial direction.

5 Claims, 10 Drawing Sheets

(56) References Cited

U.S. PATENT DOCUMENTS

| | | |
|---|---|---|
| 2005/0056496 A1 | 3/2005 | Reeves |
| 2005/0077124 A1 | 4/2005 | Reeves |
| 2006/0219490 A1* | 10/2006 | Eisengraber ........ F16D 65/0006 188/71.1 |
| 2007/0278049 A1 | 12/2007 | Kobayashi et al. |
| 2008/0264738 A1 | 10/2008 | Reeves |
| 2009/0071767 A1* | 3/2009 | Bass ................ F16D 55/228 188/72.5 |
| 2013/0020155 A1* | 1/2013 | Crippa ............... F16D 55/228 188/73.31 |
| 2013/0092481 A1* | 4/2013 | Crippa ............... F16D 55/228 188/73.31 |
| 2015/0101895 A1 | 4/2015 | Ueda et al. |
| 2018/0106310 A1 | 4/2018 | Yokoyama |

FOREIGN PATENT DOCUMENTS

| | | |
|---|---|---|
| EP | 2 169 253 A1 | 3/2010 |
| EP | 2 738 414 A2 | 6/2014 |
| EP | 3 045 758 A1 | 7/2016 |
| JP | H07-12638 U | 3/1995 |
| JP | 2003-120731 A | 4/2003 |
| JP | T-2005-517877 | 6/2005 |
| JP | 2005-319905 A | 11/2005 |
| JP | A-2008-014486 | 1/2008 |
| JP | 2009-097637 A | 5/2009 |
| JP | 2010-78055 A | 4/2010 |
| JP | 2013-29197 A | 2/2013 |
| JP | 2015-78716 A | 4/2015 |
| JP | 2016-194325 A | 11/2016 |
| WO | WO-2006/109710 A1 | 10/2006 |
| WO | WO-2010/137056 A1 | 12/2010 |
| WO | WO-2011/077471 A1 | 6/2011 |
| WO | WO-2011/121553 A1 | 10/2011 |
| WO | WO-2012/059894 A2 | 5/2012 |

OTHER PUBLICATIONS

International Search Report dated Mar. 6, 2018 for PCT/JP2017/044005.

International Search Report/Written Opinion dated Mar. 6, 2018 for PCT/JP2017/044005.

JP Office Action dated Jul. 1, 2020 from corresponding Japanese patent application No. 2016-239006 (with attached English-language translation).

* cited by examiner

OUTWARD IN AXIAL DIRECTION    INWARD IN AXIAL DIRECTION

--Prior Art--

CALIPER FOR OPPOSED PISTON TYPE DISC BRAKE

TECHNICAL FIELD

The present invention relates to a caliper for an opposed-piston type disc brake used for braking a vehicle (for example, an automobile).

BACKGROUND ART

Disc brakes are widely used in order to brake automobiles. At the time of braking by the disc brake, a pair of pads disposed on both axial sides of a rotor rotating together with a wheel are pushed against both axial side surfaces of the rotor by a piston. Although various structures have been known as such a disk brake, an opposed-piston type disk brake provided with pistons facing each other on both axial sides of the rotor are increasingly used in recent years because a stable braking force can be obtained.

FIG. 10 shows an example of a conventional structure of a caliper for an opposed-piston type disc brake described in Patent Document 1. An illustrated caliper 1 for an opposed-piston type disc brake is made by casting a light alloy, an iron-based alloy, or the like, and includes an inner body 2, an outer body 3, a rotation-in side connecting portion 4, a rotation-out side connecting portion 5, and one center bridge 6.

The inner body 2 is disposed on an axially inner side of a rotor (not shown) which rotates together with the wheel, and is provided in a state of facing an axially inner side surface of the rotor. Meanwhile, the outer body 3 is disposed on an axially outer side of the rotor, and is provided in a state of facing the axially outer side surface of the rotor. The rotation-in side connecting portion 4 and the rotation-out side connecting portion 5 are provided radially outward than an outer circumferential edge of the rotor. Further, the rotation-in side connecting portion 4 connects rotation-in side end portions of the inner body 2 and the outer body 3 in the axial direction of the rotor, and the rotation-out side connecting portion 5 connects rotation-out side end portions of the inner body 2 and the outer body 3 in the axial direction of the rotor. The center bridge 6 is provided axially outward than the outer circumferential edge of the rotor, and connects circumferentially intermediate portions of the inner body 2 and the outer body 3 in the axial direction of the rotor.

In the present specification and claims, the axial direction, the circumferential direction, and the radial direction refer to the axial direction of the rotor, the circumferential direction of the rotor, and the radial direction of the rotor unless otherwise specified. "Inward" with respect to the axial direction refers to a center side in a width direction of a vehicle when being assembled to the vehicle, and "outward" with respect to the axial direction refers to an outer side in the width direction of the vehicle. Further, unless otherwise specified, the rotation-in side refers to a side where the rotor that rotates together with the wheel in a forward state enters between the inner body and the outer body, and the rotation-out side refers to a side where the rotor comes out from between the inner body and the outer body.

Inner cylinders 7, 7 and an outer cylinder are respectively provided on surfaces of the inner body 2 and the outer body 3 facing each other. Although only the inner cylinders 7, 7 are shown in FIG. 10, outer cylinders having the same shape as that of the inner cylinders 7, 7 are provided at symmetrical positions across the rotor in the outer body 3. In a state where the disk brake device is assembled, the inner cylinders 7, 7 and the outer cylinders are opened toward the axially inner side surface and the axially outer side surface of the rotor respectively.

At the time of braking, an inner piston supported by the inner body 2 is pressed against the axially inner side surface of the rotor by the inner piston fitted to the inner cylinders 7, 7. Similarly, by an outer piston fitted to the outer cylinder, the outer pad supported by the outer body 3 is pressed against the axially outer side surface of the rotor. Accordingly, since the rotor is strongly sandwiched between the inner pad and the outer pad from both axial sides, braking is performed by friction between the inner pad, the outer pad and both axial side surfaces of the rotor.

In the caliper for an opposed-piston type disc brake as described above, it is required to ensure rigidity and reduce weight from the mechanical characteristics and the installation position.

That is, at the time of braking, as a reaction of pressing the inner pad and the outer pad against the axial side surfaces of the rotor by the piston, a force in directions away from each other is applied to the inner body and the outer body. Therefore, if the rigidity of the caliper is not sufficient, the inner body and the outer body are elastically deformed in a direction away from each other, and a desired braking force may not be obtained. When the rigidity is not sufficient, the outer body may be elastically deformed so as to be displaced in a rotation direction of the rotor with respect to the inner body at the time of braking, and vibration or noise may be generated. Particularly, in the case of an opposed-piston type disc brake mounted on a high performance vehicle such as a sports car, four or more pistons may be provided in the inner body and the outer body respectively as described in Patent Document 2. In this way, when the number of pistons provided in the caliper increases, the force acting on the inner body and the outer body increases, and the rigidity required for the caliper also increases by that much.

On the other hand, the opposed-piston type disc brake is a so-called unsprung load which is provided on a road surface side of a spring configuring a suspension device in the vehicle. Therefore, it is required to reduce the weight of the vehicle for reasons such as improving fuel economy performance and traveling performance of the vehicle.

PRIOR ART DOCUMENT

Patent Document

Patent Document 1: JP-A-2010-78055
Patent Document 2: JP-A-2013-29197

SUMMARY OF THE INVENTION

Problems to be Solved by the Invention

In view of the above circumstances, the present invention is made to realize a structure capable of ensuring rigidity while suppressing an increase in weight of a caliper for an opposed-piston type disc brake including four or more cylinder portions in each of an inner body and an outer body.

Means for Solving the Problems

The above problem according to the present invention is solved by a caliper for an opposed-piston type disc brake having the following configuration.

(1) The caliper for an opposed-piston type disc brake includes an inner body, an outer body, a rotation-in side connecting portion, a rotation-out side connecting portion, and two or more center bridges.

The inner body is disposed on an axially inner side of a rotor which rotates together with a wheel, provided in a state of facing an axially inner side surface of the rotor, and includes two or more inner cylinder portions on a radially outer side and two or more inner cylinder portions on a radially inner side in two stages in a radial direction.

The outer body is disposed on an axially outer side of the rotor, provided in a state of facing the axially outer side surface of the rotor, and includes two or more outer cylinder portions on the radially outer side and two or more outer cylinder portions on the radially inner side in two stages in the radial direction.

Further, the rotation-in side connecting portion and the rotation-out side connecting portion are disposed radially outward than an outer circumferential edge of the rotor, and connect both circumferential end portions of the inner body and both circumferential end portions of the outer body.

The center bridges is disposed between the rotation-in side connecting portion and the rotation-out side connecting portion in a circumferential direction and radially outward than the outer circumferential edge of the rotor, and connect a circumferentially intermediate portion of the inner body and a circumferentially intermediate portion of the outer body.

Further, in the case of the caliper for an opposed-piston type disc brake of the present configuration, a belt-shaped rib extending in the circumferential direction is provided at least on the axially outer side surface of the outer body. The belt-shaped rib covers radially inner side portions of bottom portions of the outer cylinder portions on the radially outer side and radially outer side portions of bottom portions of the outer cylinder portions on the radially inner side from an axially outer side so as to traverse the same in the circumferential direction.

Therefore, the radially outer side portions of the bottom portions of the outer cylinder portions on the radially outer side and the radially inner side portions of the bottom portions of the outer cylinder portions on the radially inner side are not covered by the belt-shaped rib and protrude in the radial direction from the belt-shaped rib.

Axially outer end portions of the center bridges are connected to the outer cylinder portions on the radially outer side. The center bridges which are adjacent to each other in the circumferential direction are connected to each other by a connecting portion located on a side farther from the rotor in an axial direction of the rotor than a tip end portion of a piston incorporated in each cylinder portion on the radially outer side and the radially inner side provided in at least one of the inner body and the outer body.

(2) In the caliper for an opposed-piston type disc brake described in (1), the center bridges are disposed at portions between the outer cylinder portions on the radially outer side adjacent to each other in the circumferential direction respectively.

(3) In the caliper for an opposed-piston type disc brake described in (2), a penetration hole is provided in a portion surrounded by the center bridges adjacent to each other in the circumferential direction, the connecting portions connecting these center bridges, and one of the bodies.

(4) In the caliper for an opposed-piston type disc brake described in any one of (1) to (3), the connecting portion is located axially outward than a circumferentially intermediate portion of an axially inner side surface where each of the outer cylinder portions on the radially outer side and on the radially inner side of the outer body are open.

(5) In the caliper for an opposed-piston type disc brake described in any one of (1) to (4), both side portions of the belt-shaped rib in a longitudinal direction of the belt-shaped rib are extended along the axial direction of the rotor on a rotation-in side lateral surface of the rotation-in side connecting portion and a rotation-out side lateral surface of the rotation-out side connecting portion respectively, and are continuous with an axially inner side surface of the inner body.

(6) In the caliper for an opposed-piston type disc brake described in any one of (1) to (5), a pair of attachment portions for fixing to a vehicle body are provided in the inner body in a state of being separated from each other in the circumferential direction, and the belt-shaped rib is provided in a state of being continuous with the attachment portions.

Effect of the Invention

According to the caliper for an opposed-piston type disc brake configured as described above, it is possible to realize the structure capable of ensuring rigidity while suppressing the increase in weight of the caliper for an opposed-piston type disc brake including four or more cylinder portions in each of the inner body and the outer body.

That is, in the case of the present configuration, a belt-shaped rib extending in the circumferential direction is provided at least on an axially outer side surface of the outer body, and the belt-shaped rib covers radially inner side portions of the bottom portions of the outer cylinder portions on the radially outer side and radially outer side portions of the bottom portions of the outer cylinder portions on the radially inner side from an axially outer side, and thickness of the portion provided with the belt-shaped rib is increased. Therefore, it is possible to improve the rigidity against displacement of the outer body (particularly outer cylinder portions on the radially outer side and the radially inner side) in a direction away from the inner body.

In addition, in the present embodiment, the circumferentially intermediate portions of the inner body and the outer body are connected to each other by two or more center bridges, and the axially outer end portions of the center bridges are directly connected to the outer cylinder portions on the radially outer side on which the force in the direction away from the inner body acts. Therefore, also from this surface, it is possible to improve the rigidity against displacement of the outer body (particularly outer cylinder portions on the radially outer side) and the inner body in a direction away from each other.

The center bridges which are adjacent to each other in the circumferential direction are connected to each other by a connecting portion located on a side farther from the rotor (side close to the cylinder portion on the radially outer side) in an axial direction of the rotor than a tip end portion of a piston incorporated in each cylinder portion on the radially outer side and the radially inner side provided in at least one of the inner body and the outer body. Therefore, it is possible to improve the rigidity against the relative displacement of the inner body and the outer body in the circumferential direction.

Moreover, in this configuration, instead of covering the whole bottom portions of the outer cylinder portions on the radially outer side and the whole bottom portions of the outer cylinder portions on the radially inner side, the belt-shaped rib extending in the circumferential direction convers the radially inner side portions of the bottom portions of the outer cylinder portions on the radially outer side and the radially outer side portions of the bottom portions of the outer cylinder portions on the radially inner side so as to traverse the same in the circumferential direction, and the thickness of the portions (the radially outer side portions of the bottom portions of the outer cylinder portions on the radially outer side and the radially inner side portions of the bottom portions of the outer cylinder portions on the radially inner side) which are radially outward from the belt-shaped rib is not increased.

As a result, according to the present configuration, it is possible to ensure rigidity with respect to the caliper for an opposed-piston type disc brake having four or more cylinder portions in each of the inner body and the outer body while suppressing an increase in weight.

DESCRIPTION OF EMBODIMENTS

Embodiment

Figure 1:
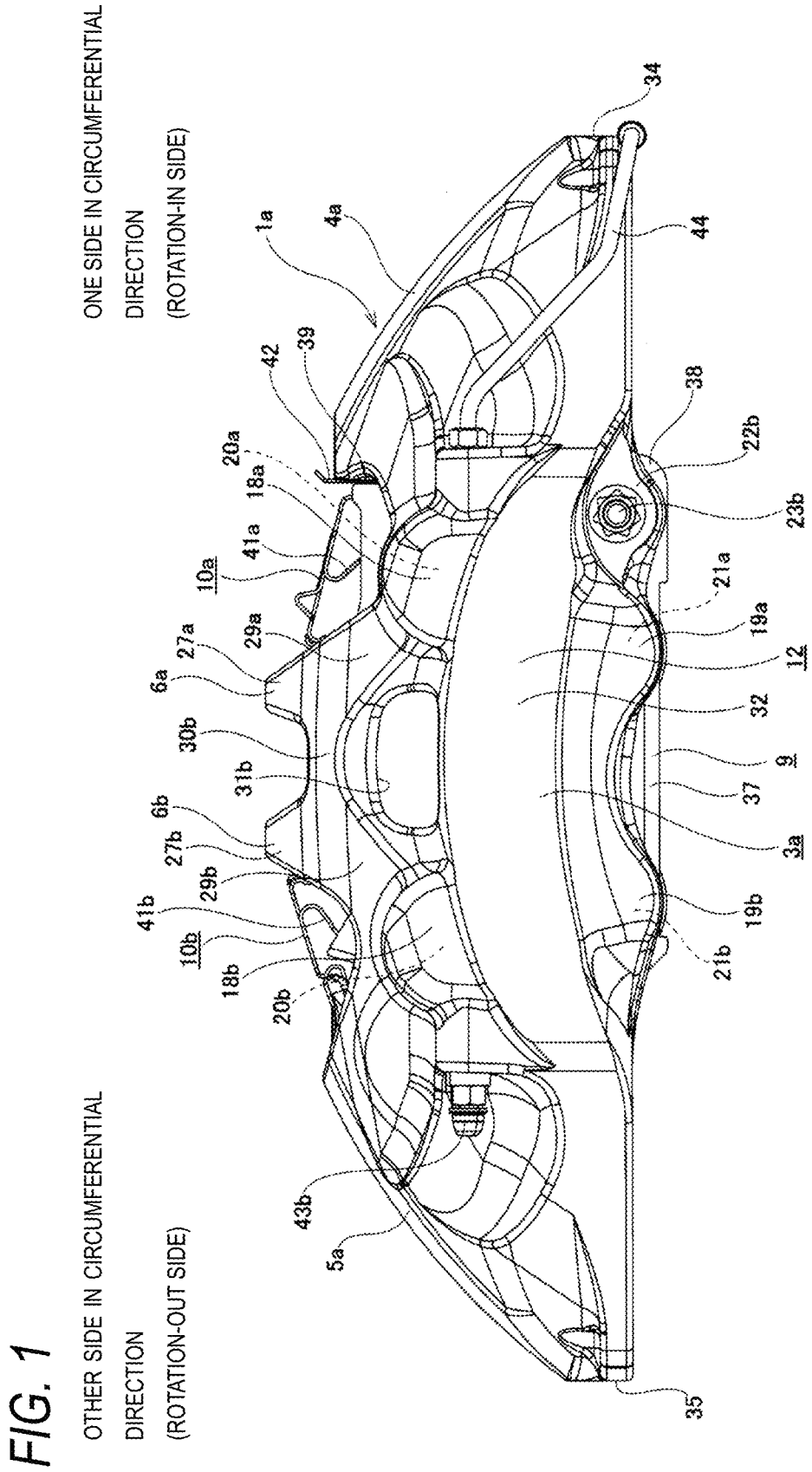
FIG. 1 is a view of an opposed-piston type disc brake as viewed from an axially outer side, showing an embodiment of the present invention.

An embodiment of the present invention will be described with reference to FIGS. 1 to 9. An opposed-piston type disc brake of the present embodiment is mounted on a high performance vehicle such as a sports car, and roughly includes a caliper 1a for an opposed-piston type disc brake (hereinafter, simply referred to as caliper 1a), a pair of pads 8, 9 (inner pad 8, outer pad 9), and pad springs 10a, 10b.

The caliper 1a supports the inner pad 8 and the outer pad 9 movably in an axial direction of a rotor 11 (a front-rear direction of a page in FIGS. 1 and 2, a left-right direction of a paper in FIGS. 3 and 4, and an upper-lower direction of a paper in FIGS. 5 and 6), and is integrally formed by casting or the like of a light alloy such as an aluminum alloy or an iron-based alloy. Such a caliper 1a includes an inner body 2a and an outer body 3a provided in a state of sandwiching a disk-shaped rotor 11 (see FIG. 5) that rotates together with a wheel, a rotation-in side connecting portion 4a and a rotation-out side connecting portion 5a connecting both circumferential end portions of the inner body 2a and the outer body 3a, two center bridges 6a, 6b connecting circumferentially intermediate portions of the inner body 2a and the outer body 3a, and a belt-shaped rib 12 provided so as to surround the periphery of the caliper 1a. The caliper 1a has a substantially arcuate shape as viewed from the axial direction of the rotor 11, and is supported and fixed to a vehicle body side (knuckle of a suspension device) by using a pair of attachment portions 13a, 13b provided in the inner body 2a in a state of being circumferentially separate from each other.

The inner body 2a is disposed on an axially inner side of the rotor 11 in a state of facing an axially inner side surface of the rotor 11. In the inner body 2a, two inner cylinder portions 14a, 14b on a radially outer side and two inner cylinder portions 15a, 15b on a radially inner side are provided in two stages in the radial direction in a state of opening to an axially outer side surface. In the present embodiment, the inner cylinder portions 14a, 14b on the radially outer side and the inner cylinder portions 15a, 15b on the radially inner side are disposed in the circumferentially intermediate portion of the inner body 2a so as to be separate from each other in the circumferential direction. Further, in an axially inner side surface of the inner body 2a, a part of the contour shapes of the inner cylinder portions 14a, 14b on the radially outer side and the inner cylinder portions 15a, 15b on the radially inner side, which have a bottomed cylindrical shape, appears. In order to supply and discharge pressure oil to deep portions of the inner cylinder portions 14a, 14b on the radially outer side and the inner cylinder portions 15a, 15b on the radially inner side, an oil passage hole (not shown) is formed inside the inner body 2a, and the oil passage hole is open to the deep portions of the inner cylinder portions 14a, 14b on the radially outer side and the inner cylinder portions 15a, 15b on the radially inner side. One end portion (another circumferential end portion) of the oil passage hole is blocked by a bleeder screw 43a, and another end portion (one circumferential end portion) communicates with another end portion of an oil passage hole provided in the outer body 3a by a communication pipe 44. An oil supply port 45 provided at the circumferentially intermediate portion of the axially inner side surface of the inner body 2a communicates with the oil passage hole provided in the inner body 2a. Inner pistons 16a, 16b on the radially outer side are oil-tightly fitted to the inner cylinder portions 14a, 14b on the radially outer side so as to be displaceable in the axial direction, and inner pistons 17a, 17b on the radially inner side are oil-tightly fitted to the inner cylinder portions 15a, 15b on the radially inner side so as to be displaceable in the axial direction.

The outer body 3a is disposed on the axially outer side of the rotor 11 in a state of facing an axially outer side surface of the rotor 11. On an axially inner side surface of the outer body 3a, two outer cylinder portions 18a, 18b on the radially outer side and two outer cylinder portions 19a, 19b on the radially inner side are provided in two stages in the radial direction at parts facing the inner cylinder portions 14a, 14b on the radially outer side and the inner cylinder portions 15a, 15b on the radially inner side provided on the inner body 2a. On an axially outer side surface of the outer body 3a, a part of the contour shapes of the outer cylinder portions 18a, 18b on the radially outer side and the outer cylinder portions 19a, 19b on the radially inner side, which have a bottomed cylindrical shape, appears. In order to supply and discharge pressure oil to deep portions of the outer cylinder portions 18a, 18b on the radially outer side and the outer cylinder portions 19a, 19b on the radially inner side, the oil passage hole (not shown) is formed inside the outer body 3a, and the oil passage hole is open to the deep portions of the outer cylinder portions 18a, 18b on the radially outer side and the outer cylinder portions 19a, 19b on the radially inner side. Further, one end portion (another circumferential end portion) of the oil passage hole is blocked by a bleeder screw 43b, and another end portion (one circumferential end portion) communicates with the other end portion of the oil passage hole provided in the outer body 2a by the communication pipe 44. Outer pistons 20a, 20b on the radially outer side are oil-tightly fitted to the outer cylinder portions 18a, 18b on the radially outer side so as to be displaceable in the axial direction, and inner pistons 21a, 21b on the radially inner side are oil-tightly fitted to the outer cylinder portions 19a, 19b on the radially inner side so as to be displaceable in the axial direction.

Figure 2:
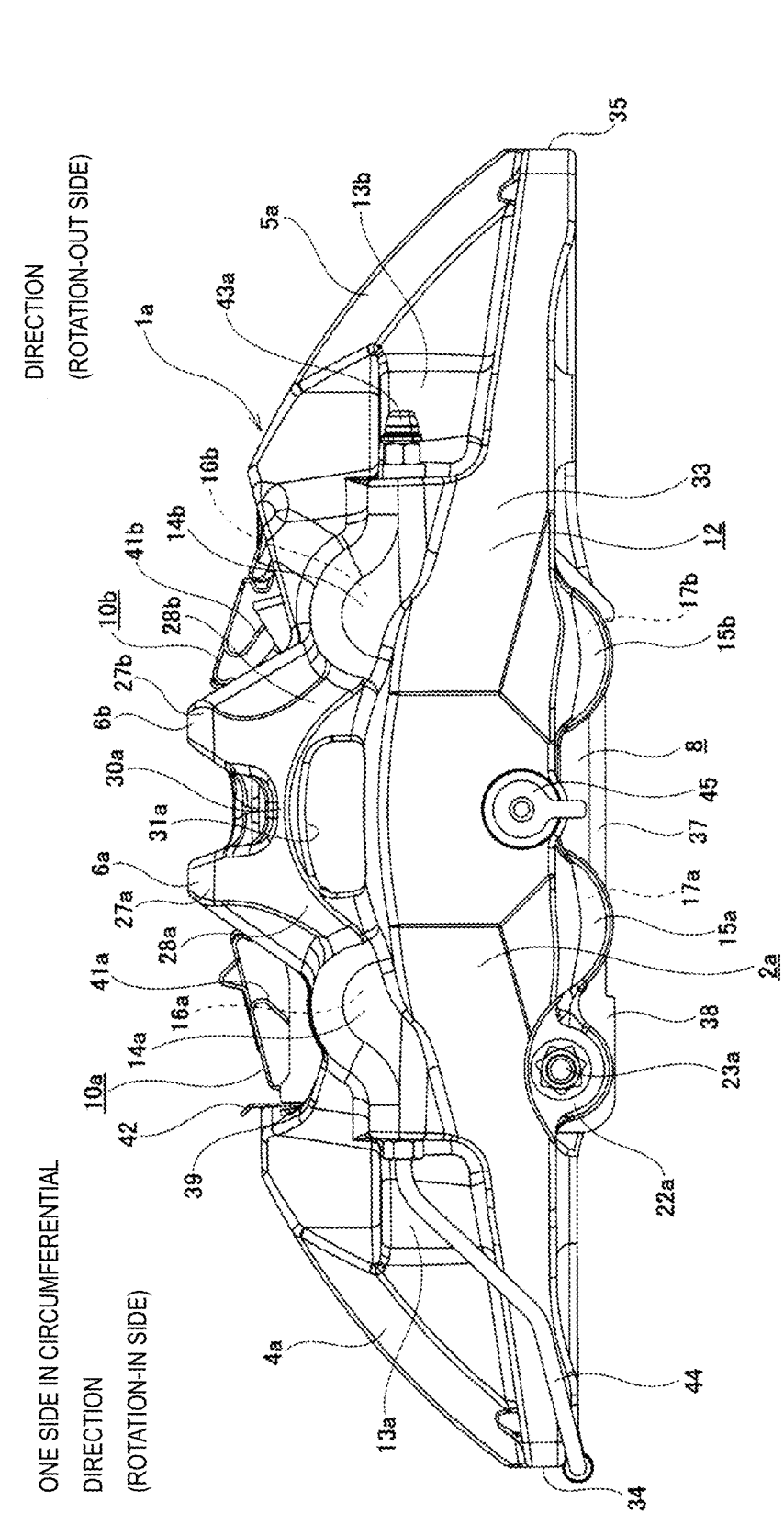
FIG. 2 is a view of the opposed-piston type disc brake shown in FIG. 1 as viewed from an axially inner side.
Figure 3:
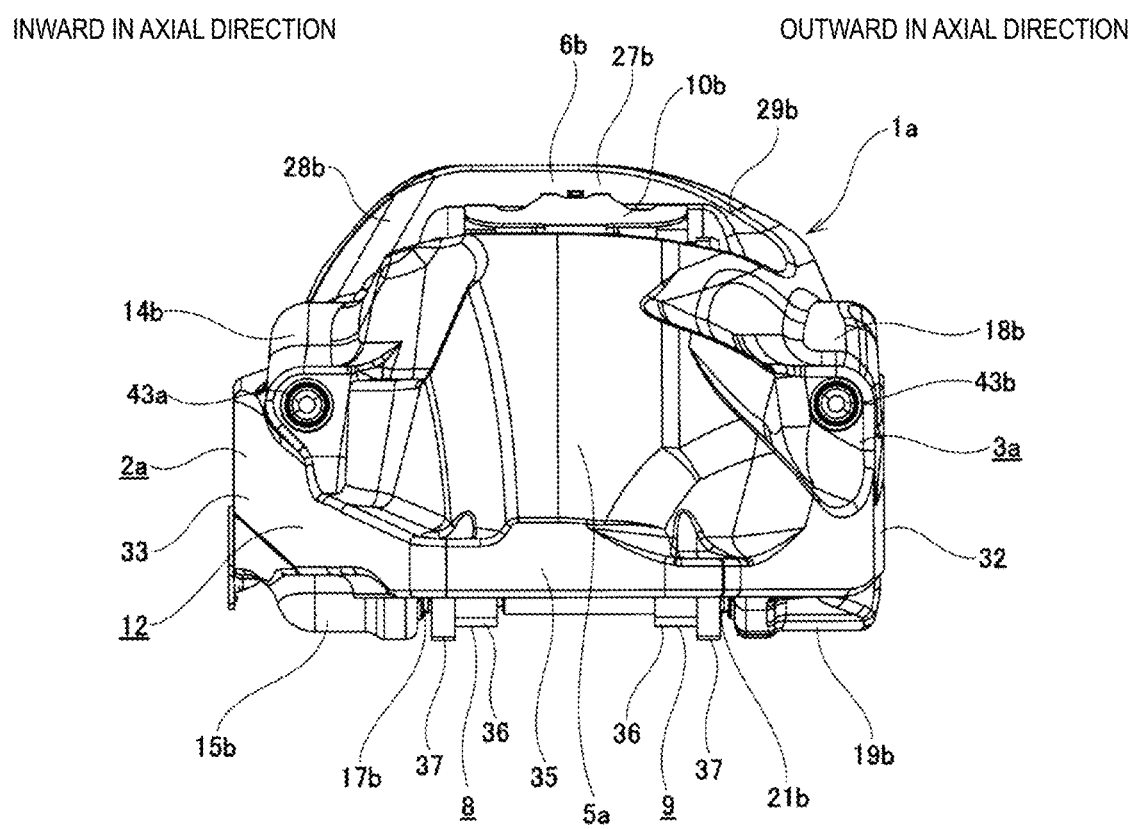
FIG. 3 is a view of the opposed-piston type disc brake shown in FIG. 1 as viewed from a rotation-out side.
Figure 4:
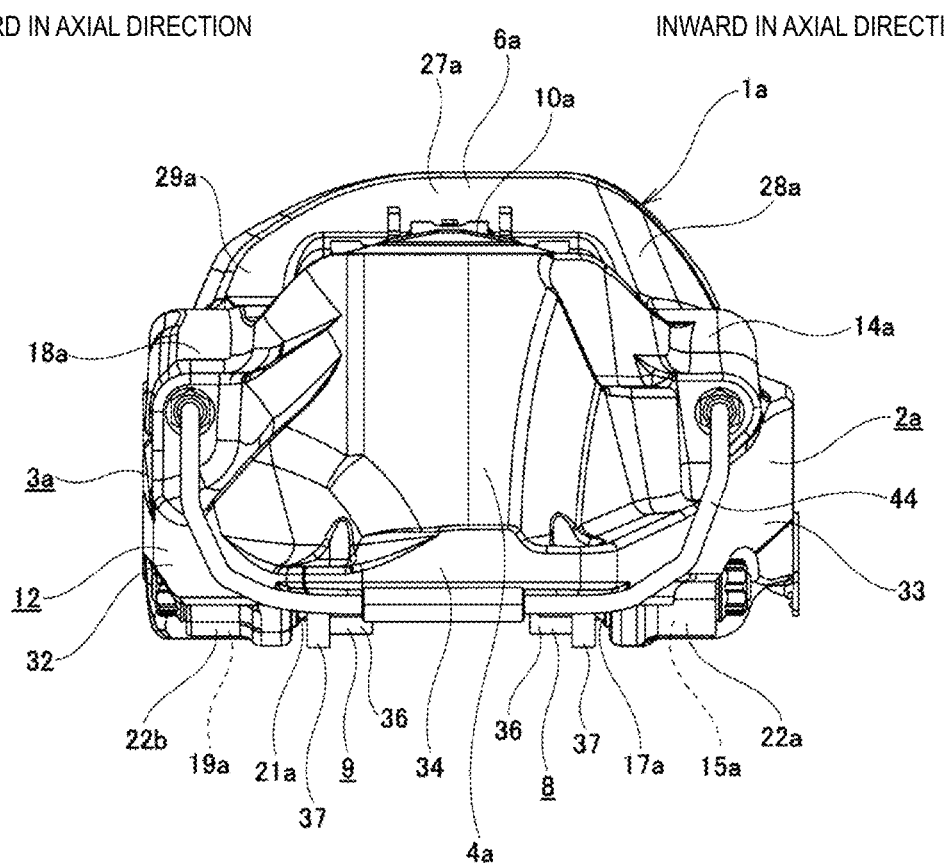
FIG. 4 is a view of the opposed-piston type disc brake shown in FIG. 1 as viewed from a rotation-in side.
Figure 5:
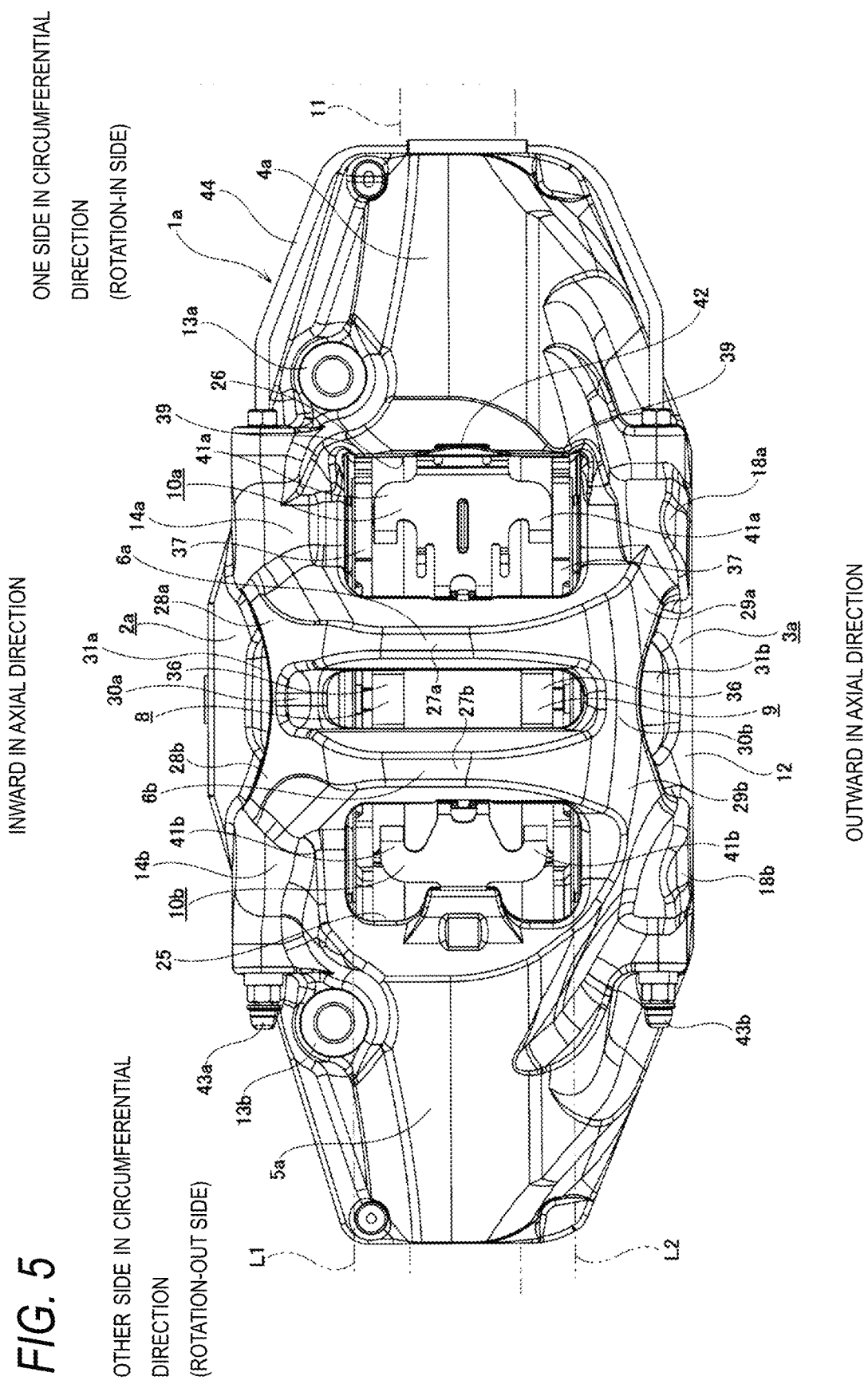
FIG. 5 is a view of the opposed-piston type disc brake shown in FIG. 1 as viewed from a radially outer side.
Figure 6:
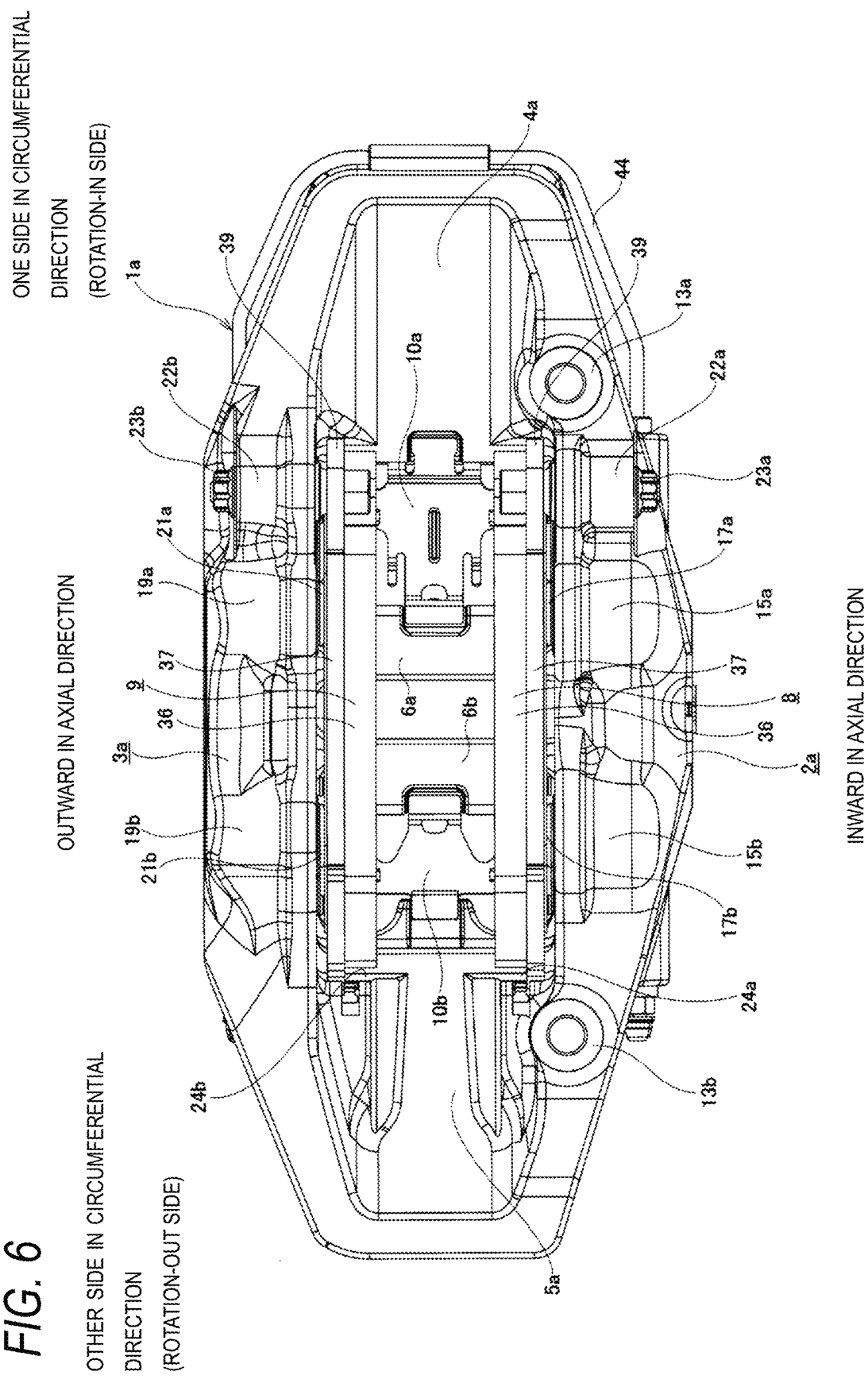
FIG. 6 is a view of the opposed-piston type disc brake shown in FIG. 1 as viewed from a radially inner side.
Figure 7:
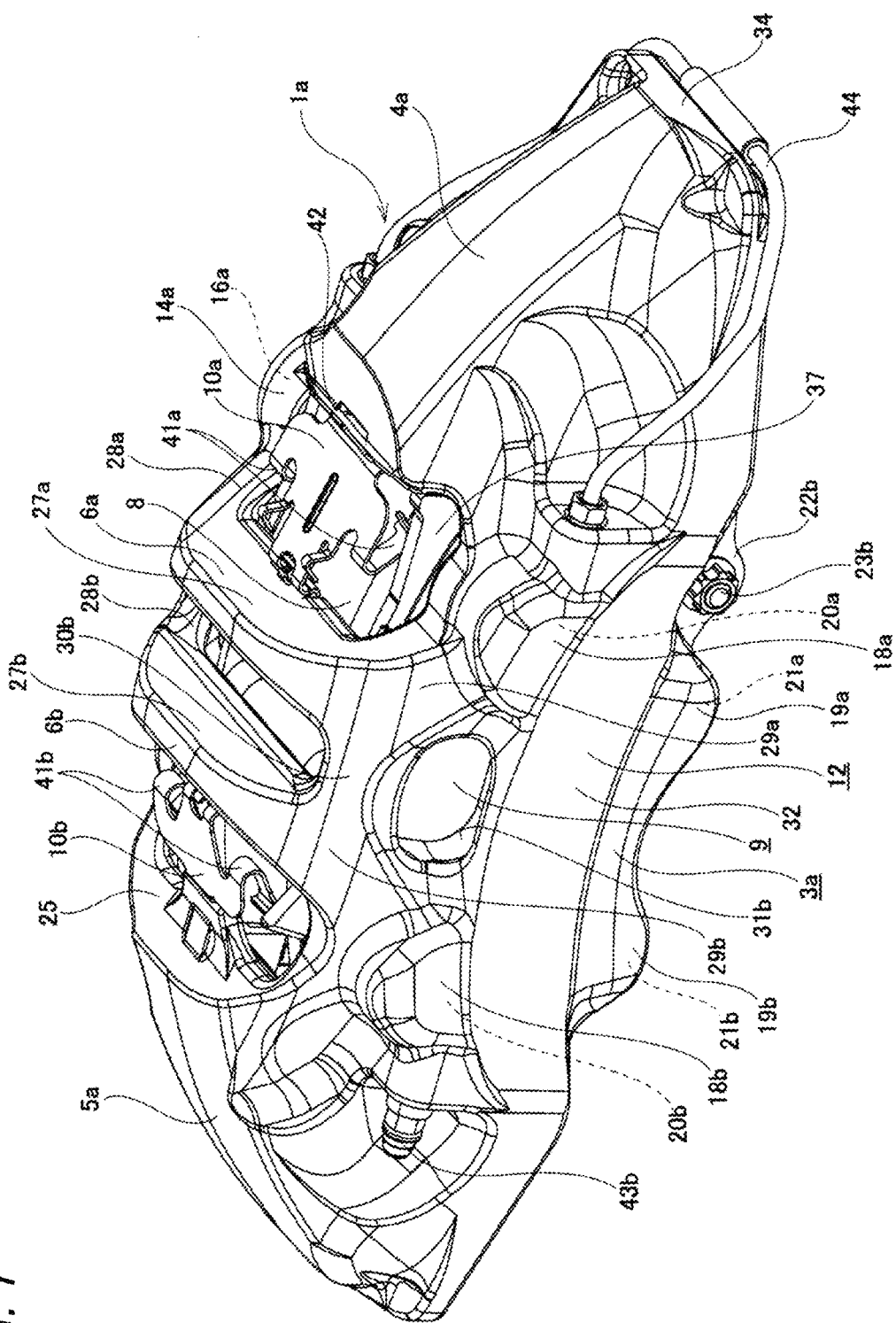
FIG. 7 is a perspective view of the opposed-piston type disc brake shown in FIG. 1 as viewed from the radially outer side, the axially outer side, and the rotation-in side.
Figure 8:
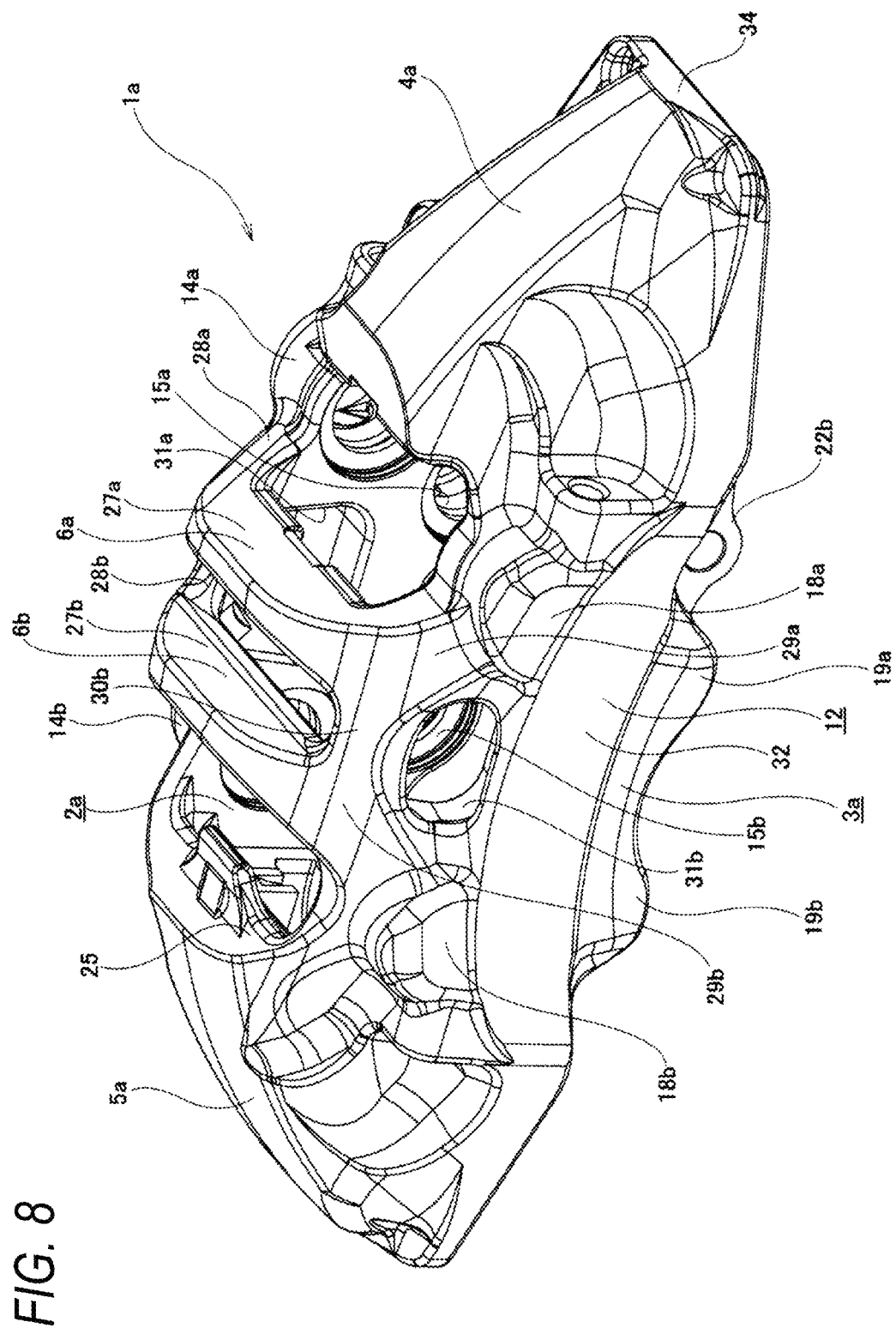
FIG. 8 is a view corresponding to FIG. 7, showing the caliper for an opposed-piston type disc brake shown in FIG. 1 in a taken out state.
Figure 9:
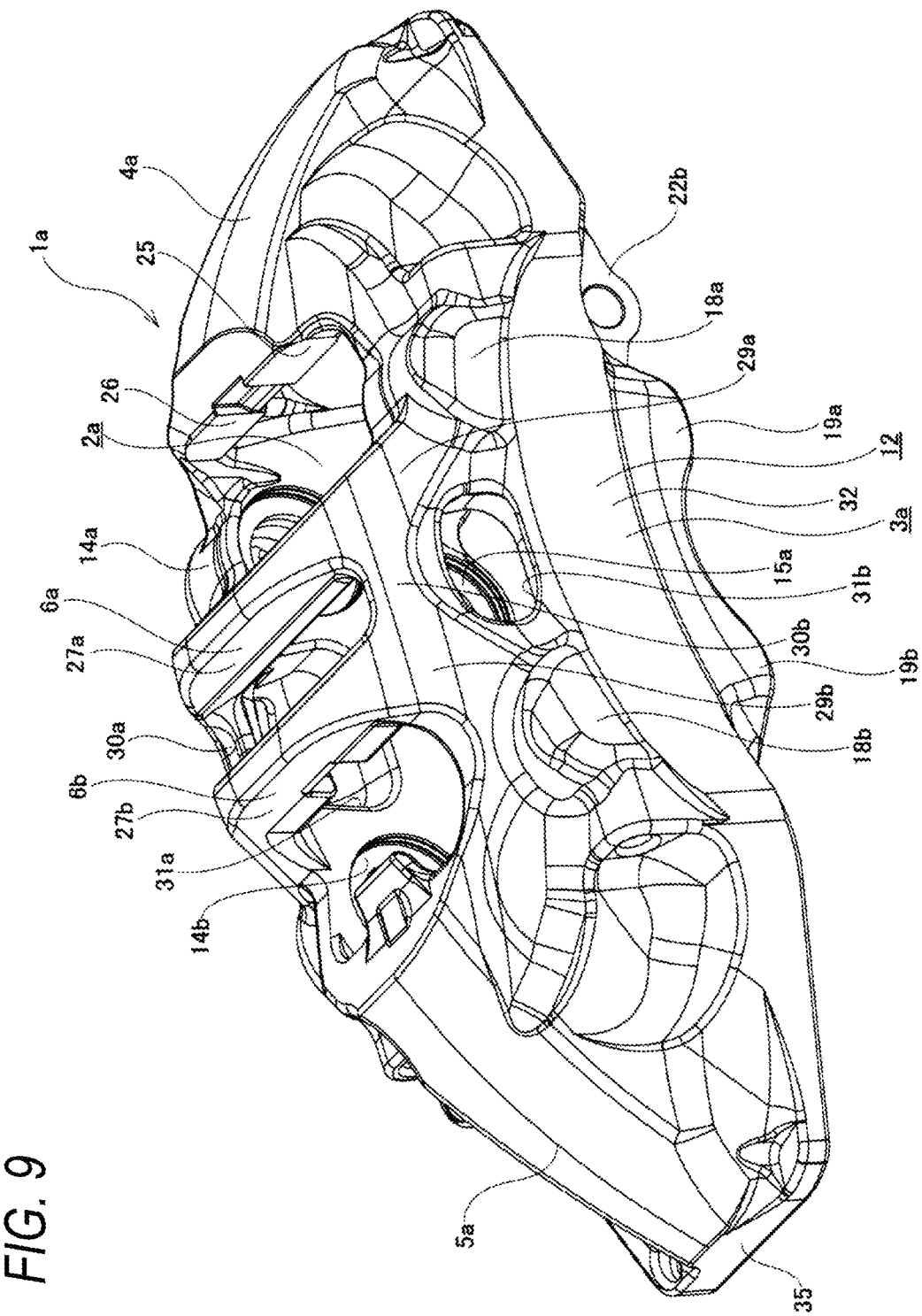
FIG. 9 is a perspective view showing the caliper for an opposed-piston type disc brake shown in FIG. 1 in the taken out state as viewed from the radially outer side, the axially outer side, and the rotation-out side.
Figure 10:
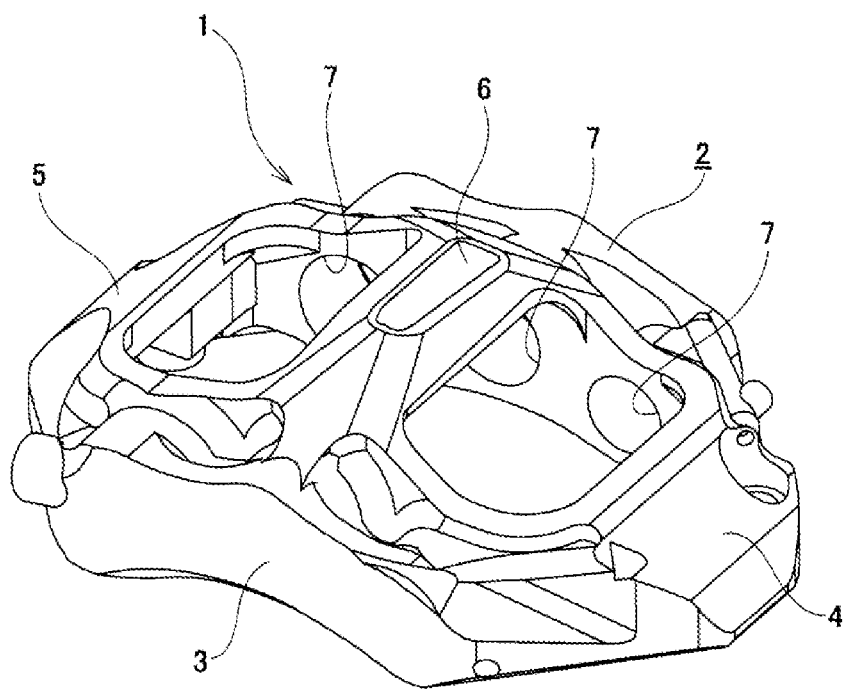
FIG. 10 is a perspective view showing a caliper for an opposed-piston type disc brake of a conventional structure.

In the present embodiment, radially inner side surfaces of both circumferential side portions of the inner body 2a are flat surfaces presenting on a same virtual plane, and are disposed radially outward (upper side in FIG. 2) than the inner cylinder portions 15a, 15b on the radially inner side provided at the circumferentially intermediate portion of the inner body 2a. Therefore, when the caliper 1a in the present embodiment is viewed from the axially inner side, as shown in FIG. 2, lower end portions of the inner cylinder portions 15a, 15b on the radially inner side which have a bottomed cylindrical shape protrude downward than the both circumferential side portions (flat surface portions) of the inner body 2a. Similarly, radially inner side surfaces of both circumferential side portions of the outer body 3a are flat surfaces presenting on a same virtual plane, and are disposed radially outward (upper side in FIG. 1) than the outer cylinder portions 19a, 19b on the radially inner side provided at the circumferentially intermediate portion of the inner body 3a. Therefore, when the caliper 1a in the present embodiment is viewed from the axially outer side, as shown in FIG. 1, lower end portions of the outer cylinder portions 19a, 19b on the radially inner side which have a bottomed cylindrical shape protrude downward than the both circumferential side portions (flat surface portions) of the inner body 3a.

In the inner body 2a and the outer body 3a, projection portions 22a, 22b projecting radially inward are provided at a part adjacent to circumferential sides (rotation-in sides) of the inner cylinder portion 15a on the radially inner side and the outer cylinder portion 19a on the radially inner side located on the rotation-in side. A pair of pad pins 23a, 23b are concentrically supported and fixed (fixedly install) to each other with respect to the projection portions 22a, 22b in a state where respective tip end portions axially protrude toward the rotor 11. The pad pins 23a, 23b are engaged with through holes (not shown) formed in the inner pad 8 and the outer pad 9 to support a brake tangential force acting on the inner pad 8 and the outer pad 9 at the time of forward braking.

On the other hand, a pair of guide wall portions 24a, 24b projecting in the axial direction are provided on axial side surfaces of the inner body 2a and the outer body 3a facing each other in another circumferential side (rotation-out side). In addition, guide concave grooves (not shown) are provided at radially intermediate portions of the guide wall portions 24a, 24b for engaging ears provided at rotation-out side portions of the inner pad 8 and the outer pad 9.

The rotation-in side connecting part 4a and the rotation-out side connecting part 5a are provided radially outward than the circumferential edge of the rotor 11, and connect both circumferential end portions of the inner body 2a and both circumferential end portions of the outer body 3a to each other. Specifically, the rotation-in side connecting portion 4a connects a rotation-in side end portion of the inner body 2a and a rotation-in side end portion of the outer body 3a in the axial direction. The rotation-out side connecting portion 5a connects a rotation-out side end portion of the inner body 2a and a rotation-out side end portion of the outer body 3a in the axial direction. Further, the rotation-in side connecting portion 4a and the rotation-out side connecting portion 5a are formed in a partial arc shape along the outer circumferential edge of the rotor 11, and cover the rotor 11 from a radially outer side via a predetermined gap. A portion surrounded by the inner body 2a and the outer body 3a and the rotation-in side connecting portion 4a and the rotation-out side connecting portion 5a is an opening portion 25 which penetrates in the radial direction and has a substantially rectangular shape in plan view.

A part of the rotation-in side connecting portion 4a which forms a rotation-in side end edge of the opening portion 25 is a flat surface-shaped torque receiving surface 26. The torque receiving surface 26 supports the brake tangential force acting on the inner pad 8 and the outer pad 9 at the time of reverse braking.

The center bridges 6a, 6b are each formed in a rod shape, disposed between the rotation-in side connecting portion 4a and the rotation-out side connecting portion 5a in the circumferential direction and radially outward than the outer circumferential edge of the rotor 11, and connect the circumferentially intermediate portions of the inner body 2a and the outer body 3a in the axial direction. In the present embodiment, the center bridges 6a, 6b are disposed between the outer cylinder portions 18a, 18b on the radially outer side (inner cylinder portions 14a, 14b on the radially outer side) in the circumferential direction in a state of being separated in the circumferential direction.

The axially inner end portions of the center bridges 6a, 6b are directly connected to outer circumferential portions of the inner cylinder portions 14a, 14b on the radially outer side respectively, and the axially outer end portions of the center bridges 6a, 6b are directly connected to outer circumferential portions of the outer cylinder portions 18a, 18b on the radially outer side respectively. The center bridges 6a, 6b include linear portions 27a, 27b which are parallel to each other and are provided in the axially intermediate portion, inner side bent portions 28a, 28b which are provided on axially inner sides of the respective linear portions 27a, 27b and extend in directions away from each other in the circumferential direction as approaching the inner cylinder portions 14a, 14b on the radially outer side, and outer side bent portions 29a, 29b which are provided on axially outer sides of the linear portions 27a, 27b and extend in directions away from each other in the circumferential direction as approaching the outer cylinder portions 18a, 18b on the radially outer side.

The center bridges 6a, 6b are connected to each other in the circumferential direction by connecting portions 30a, 30b provided at two positions in the axial direction. Of the two connecting portions 30a, 30b, the connecting portion 30a disposed on the axially inner side is located axially inward than parts where respective tip end portions of the inner pistons 16a, 16b on the radially outer side and the inner pistons 17a, 17b on the radially inner side are located (two-dot chain line L1 in FIG. 5) in a state where the inner pistons 16a, 16b on the radially outer side and the inner pistons 17a, 17b on the radially inner side are incorporated in the inner cylinder portions 14a, 14b on the radially outer side and the inner cylinder portions 15a, 15b on the radially inner side. Particularly, in the case of the present embodiment, of the axially outer side surface of the inner body 2a, the connecting portion 30a is disposed axially inward than the circumferentially intermediate portion where the inner cylinder portions 14*a*, 14*b* on the radially outer side and the inner cylinder portions 15*a*, 15*b* on the radially inner side are open respectively. A penetration hole 31*a* penetrating in the axial direction and having a substantially rectangular opening portion is provided at a portion surrounded by the connecting portion 30*a*, the pair of center bridges 6*a*, 6*b* (inner side bent portions 28*a*, 28*b*), and an outer circumferential edge portion of the inner body 2*a*. The penetration hole 31*a* is located between the inner cylinder portions 14*a*, 14*b* on the radially outer side in the circumferential direction.

On the other hand, the other connecting portion 30*b* is located axially outward than parts where respective tip end portions of the outer pistons 20*a*, 20*b* on the radially outer side and the outer pistons 21*a*, 21*b* on the radially inner side are located (two-dot chain line L2 in FIG. 5) in a state where the outer pistons 20*a*, 20*b* on the radially outer side and the outer pistons 21*a*, 21*b* on the radially inner side are incorporated in the outer cylinder portions 18*a*, 18*b* on the radially outer side and the outer cylinder portions 19*a*, 19*b* on the radially inner side. Particularly, in the case of the present embodiment, of the axially inner side surface of the outer body 3*a*, the connecting portion 30*b* is disposed axially inward than the circumferentially intermediate portion where the outer cylinder portions 18*a*, 18*b* on the radially outer side and the outer cylinder portions 19*a*, 19*b* on the radially inner side are open respectively. A penetration hole 31*b* penetrating in the axial direction and having a substantially rectangular opening portion is provided at a portion surrounded by the connecting portion 30*b*, the pair of center bridges 6*a*, 6*b* (outer side bent portions 29*a*, 29*b*), and an outer circumferential edge portion of the outer body 3*a*. The penetration hole 31*b* is located between the outer cylinder portions 18*a*, 18*b* on the radially outer side in the circumferential direction.

Further, in the case of the present embodiment, in order to improve the rigidity while suppressing an increase in the weight of the caliper 1*a*, the belt-shaped rib 12 is provided on a surface (outer surface) of the caliper 1*a*, and the thickness of the portion where the belt-shaped rib 12 is provided is increased. Since the outer body 3*a* in the caliper 1*a* has a lower rigidity in the axial direction than the inner body 2*a* provided with the attachment portions 13*a*, 13*b* fixed to the vehicle body, it is necessary to provide the belt-shaped rib 12 at least on the axially outer side surface of the outer body 3*a*. However, in the case of the present embodiment, for the purpose of further ensuring rigidity, both side portions of the belt-shaped rib 12 in a longitudinal direction of the belt-shaped rib 12 provided on the axially outer side surface of the outer body 3*a* are extended along a rotation-in side lateral surface of the rotation-in side connecting portion 4*a* and a rotation-out side lateral surface of the rotation-out side connecting portion 5*a* respectively, and are continuous with the axially inner side surface of the inner body 2*a*. That is, the belt-shaped rib 12 surrounds the periphery of the caliper 1*a*.

The belt-shaped rib 12 of the present embodiment includes a belt-shaped outer side rib 32 provided on the axially outer side surface of the outer body 3*a*, a belt-shaped inner side rib 33 provided on the axially inner side surface of the inner body 2*a*, a belt-shaped rotation-in side rib 34 provided on the rotation-in side lateral surface of the rotation-in side connecting portion 4*a*, and a belt-shaped rotation-out side rib 35 provided on the rotation-out side lateral surface of the rotation-out side connecting portion 5*a*, and the whole is formed into an annular shape by making end portions of the ribs 32 to 35 in the longitudinal direction continuous with each other. Each of the ribs 32 to 35 has a smooth surface, and the surfaces thereof are smoothly continuous (so that no corner is present).

The outer side rib 32 is provided on the axially outer side surface of the outer body 3*a* in a state of extending in the circumferential direction. In addition, a circumferentially intermediate portion of the outer side rib 32 is disposed at a radially intermediate portion of the axially outer side surface of the outer body 3*a*, whereas both circumferential side portions of the outer side rib 32 are disposed at a radially inner end portion of the axially outer side surface of the outer body 3*a*. In addition to a fact that the rigidity in the axial direction of the outer body 3*a* becomes lower in the radially inner side portion than in the radially outer side portion which is axially connected to the rotation-in side connecting portion 4*a*, the rotation-out side connecting portion 5*a*, and the center bridges 6*a*, 6*b*, this is because a force acts on the outer cylinder portions 18*a*, 18*b* on the radially outer side and the outer cylinder portions 19*a*, 19*b* on the radially inner side disposed in the circumferentially intermediate portion of the outer body 3*a* in two stages in the radial direction in a direction away from the inner body 2*a*. The circumferentially intermediate portion of the outer side rib 32 has a radial width dimension greater than both circumferential side portions of the outer side rib 32 and is curved in an arc shape in which the radially outer side is convex, and covers radially inner side portions of bottom portions of the outer cylinder portions 18*a*, 18*b* on the radially outer side and radially outer side portions of bottom portions of the outer cylinder portions 19*a*, 19*b* on the radially inner side from the axially outer side so as to traverse the same in the circumferential direction. Therefore, radially outer side portions of the bottom portions of the outer cylinder portions 18*a*, 18*b* on the radially outer side and radially inner side portions of the bottom portions of the outer cylinder portions 19*a*, 19*b* on the radially inner side are not covered by the outer side rib 32 and protrude in the radial direction from the outer side rib 32.

The inner rib 33 is provided on the axially inner side surface of the inner body 2*a* in a state of extending in the circumferential direction. Also in the case of the inner rib 33, a circumferentially intermediate portion is disposed at a radially intermediate portion of the axially inner side surface of the inner body 2*a*, and both circumferential side portions are disposed at a radially inner end portion of the axially inner side surface of the inner body 2*a*. The circumferentially intermediate portion of the inner side rib 33 covers radially inner side portions of bottom portions of the inner cylinder portions 14*a*, 14*b* on the radially outer side and radially outer side portions of bottom portions of the inner cylinder portions 15*a*, 15*b* on the radially inner side from the axially inner side so as to traverse in the circumferential direction. Therefore, radially outer side portions of the bottom portions of the inner cylinder portions 14*a*, 14*b* on the radially outer side and radially inner side portions of the bottom portions of the inner cylinder portions 15*a*, 15*b* on the radially inner side are not covered by the inner side rib 33 and protrude in the radial direction from the inner side rib 33. Further, both circumferential side portions of the inner side rib 33 are connected to the attachment portions 13*a*, 13*b* by covering the pair of attachment portions 13*a*, 13*b* from the axially inner side.

The rotation-in side rib 34 is provided at a radially inner end portion of the rotation-in side connecting portion 4*a* in a state of extending in the axial direction. Both end portions of the rotation-in side rib 34 in the longitudinal direction are continuous with the rotation-in side end portion of the outer side rib 32 and the rotation-in side end portion of the inner side rib 33 respectively.

The rotation-out side rib 35 is provided at the radially inner end portion of the rotation-out side lateral surface of the rotation-out side connecting portion 5*a* in a state of extending in the radial direction. Both end portions of the rotation-out side rib 35 in the longitudinal direction are continuous with the rotation-out side end portion of the outer side rib 32 and the rotation-out side end portion of the inner side rib 33 respectively.

The inner pad 8 and the outer pad 9 include linings (friction materials) 36, 36 and metal back plates (pressure plates) 37, 37 supporting back surfaces of the linings 36, 36. In the present embodiment, the shapes of both circumferential end portions of the inner pad 8 and the outer pad 9 (the lining 36 and the back plate 37) are asymmetric in the circumferential direction. That is, a protrusion portion 38 having a through hole for inserting the pad pin 23*a* (23*b*) is provided at one circumferential end portion (rotation-in side end portion) of the back plate 37, whereas an ear portion (not shown) protruding toward the other side in the circumferential direction is provided at another circumferential end portion (rotation-out side end portion) of the back plate 37 without providing such a protrusion portion and such a through hole. Further, a torque transmission surface 39 is formed at a radially outer end portion of a circumferential end edge of the back plate 37.

Since the inner pad 8 and the outer pad 9 having the above-described configuration are supported so as to be movable in the axial direction with respect to the caliper 1*a*, the pad pins 23*a*, 23*b* are loosely inserted inside the through hole provided at the respective one circumferential end portions of the back plates 37, 37, and the ear portions provided at the respective other circumferential end portions of the back plates 37, 37 are inserted inside the guide concave grooves provided at the guide wall portions 24*a*, 24*b* of the inner body 2*a* and the outer body 3*a* via pad clips (not shown). In this state, the torque transmission surfaces 39, 39 provided at respective one circumferential end sides of the back plates 37, 37 are opposed to the torque receiving surface 26 provided on the rotation-in side connecting portion 4*a* in the circumferential direction.

In the present embodiment, the pair of pad springs 10*a*, 10*b* are mounted to the caliper 1*a* respectively, and the inner pad 8 and the outer pad 9 are pressed radially inward. The pad springs 10*a*, 10*b* are made of a metal plate having elasticity and corrosion resistance, such as a stainless steel plate, and are attached to a portion between the rotation-in side connecting portion 4*a* and the center bridge 6*b* and a portion between the rotation-out side connecting portion 5*a* and the center bridge 6*b*. In this state, outer circumferential edge portions of respective one circumferential end side portions of the back plates 37, 37 are elastically pressed radially inward by a pair of pressing portions 41*a*, 41*a* provided at the one pad spring 10*a*. Outer circumferential edge portions of respective another circumferential end side portions of the back plates 37, 37 are elastically pressed radially inward and away from each other in the axial direction by a pair of pressing portions 41*b*, 41*b* provided at the other pad spring 10*b*. Further, a held portion 42 provided at the one pad springs 10*a* is disposed between the torque receiving surface 26 provided at the rotation-in side connecting portion 4*a* and the torque transmission surfaces 39, 39 provided on the back plates 37, 37. In the present embodiment, since the pad springs 10*a*, 10*b* having such a configuration are provided, the posture of the inner pad 8 and the outer pad 9 in the non-braking state is stabilized, and the sliding portion between the torque transmission surface 39 and the torque receiving surface 26 is prevented from rusting.

Also in the case of the opposed-piston type disc brake of the present embodiment having the above-described configuration, at the time of braking, pressure oil is supplied to the inner cylinder portions 14*a*, 14*b* on the radially outer side and the inner cylinder portions 15*a*, 15*b* on the radially inner side and pushed out from the inner pistons 16*a*, 16*b* on the radially outer side and the inner pistons 17*a*, 17*b* on the radially inner side, so that the lining 36 of the inner pad 8 supported by the inner body 2*a* is pressed against the axially inner side surface of the rotor 11. Similarly, pressure oil is supplied to the outer cylinder portions 18*a*, 18*b* on the radially outer side and the outer cylinder portions 19*a*, 19*b* on the radially inner side and pushed out from the outer pistons 20*a*, 20*b* on the radially outer side and the outer pistons 21*a*, 21*b* on the radially inner side are pushed out, so that the lining 36 of the outer pad 9 supported by the outer body 3*a* is pressed against the axially outer side surface of the rotor 11. Accordingly, since the rotor 11 is strongly sandwiched between the inner pad 8 and the outer pad 9 from both axial sides, braking is performed by friction between the inner pad 8, the outer pad 9 and both axial side surfaces of the rotor 11.

Particularly, in the case of the present embodiment, the rigidity can be ensured while minimizing an increase in weight for the caliper 1*a* including four cylinder portions in each of the inner body 2*a* and the outer body 3*a*. First, after the reason why the rigidity can be ensured (improved) by the caliper 1*a* of the present embodiment is described, the reason why weight increase can be suppressed is described.

Stiffness Improvement by Belt-Shaped Rib

As described above, in the case of the present embodiment, since the belt-shaped rib 12 is provided so as to surround the periphery of the caliper 1*a*, it is possible to improve the rigidity of the caliper 1*a* against displacement (opening) of the inner body 2*a* and the outer body 3*a* away from each other in the axial direction.

In addition, the outer side rib 32 provided on the axially outer side surface of the outer body 3*a* of the belt-shaped rib 12 covers the radially inner side portions of the bottom portions of the outer cylinder portions 18*a*, 18*b* on the radially outer side and the radially outer side portions of the bottom portions of the outer cylinder portions 19*a*, 19*b* on the radially inner side from the axially outer side. Therefore, a portion of the force acting on all the outer cylinder portions 18*a*, 18*b*, 19*a*, 19*b* on the radially outer side and the radially inner side in the direction away from the inner body 2*a* can be supported by the outer side rib 32 at the time of braking. Therefore, displacement of the outer cylinder portions 18*a*, 18*b* on the radially outer side and the outer cylinder portions 19*a*, 19*b* on the radially inner side in the direction away from the inner body 2*a* can be suppressed.

Similarly, in the present embodiment, the inner side rib 33 provided on the axially inner side surface of the inner body 2*a* covers the radially inner side portions of the bottom portions of the inner cylinder portions 14*a*, 14*b* on the radially outer side and the radially outer side portions of the bottom portions of the inner cylinder portions 15*a*, 15*b* on the radially inner side from the axially inner side. Therefore, a portion of the force acting on all the inner cylinder portions 14*a*, 14*b*, 15*a*, 15*b* on the radially outer side and the radially inner side in the direction away from the outer body 3*a* can be supported by the inner side rib 33 at the time of braking. Therefore, displacement of the inner cylinder portions 14*a*, 14b on the radially outer side and the inner cylinder portions 15a, 15b on the radially inner side in the direction away from the outer body 3a can be suppressed.

Further, the outer side rib 32 and the inner side rib 33 are each formed in a shape extending in the circumferential direction, and the outer side rib 32 and the inner side rib 33 in the outer body 3a and the inner body 2a are connected to the rotation-in side connecting portion 4a and the rotation-out side connecting portion 5a, so that the outer side rib 32 and the inner side rib 33 are continuous with both circumferential side portions higher in rigidity in the axial direction than the circumferentially intermediate portion. Therefore, a part of the force acting on the belt-shaped rib 12 from the cylinder portions 14a, 14b, 15a, 15b, 18a, 18b, 19a, 19b on the radially outer side and the radially inner side can be supported by both circumferentially side portions of the inner body 2a and the outer body 3a.

Further, since a part of the inner side rib 33 configuring the belt-shaped rib 12 is connected to the attachment portions 13a, 13b having a high rigidity in the inner body 2a, a part of the force acting on the belt-shaped rib 12 can be supported by the attachment portions 13a, 13b.

Rigidity Enhancement by Center Bridge

In addition, in the present embodiment, the circumferentially intermediate portions of the inner body 2a and the outer body 3a are connected to each other by two center bridges 6a, 6b, and the axially outer end portions of the center bridges 6a, 6b are directly connected to the outer cylinder portions 18a, 18b on the radially outer side on which the force in the direction away from the inner body 2a acts. Therefore, it is possible to improve the rigidity of the caliper 1a against displacement of the outer body 3a (particularly the outer cylinder portions 18, 18b a on the radially outer side) and the inner body 2a in a direction away from each other.

Rigidity Enhancement by Connecting Portion

Of the pair of connecting portions 30a, 30b connecting the center bridges 6a, 6b adjacent in the circumferential direction, the connecting portion 30a on the axially inner side is disposed in a portion closer to the inner cylinder portions 14a, 14b on the radially outer side, which is axially inward than the tip end portions of the inner pistons 16a, 16b on the radially outer side and the inner pistons 17a, 17b on the radially inner side. Further, the connecting portion 30b on the axially outer side is disposed in a portion closer to the outer cylinder portions 18a, 18b on the radially outer side, which is axially outward than the tip end portions of the outer pistons 20a, 20b on the radially outer side and the outer pistons 21a, 21b on the radially inner side. Accordingly, of the center bridge 6a, 6b, the rigidity of the inner side bent portions 28a, 28b and the outer side bent portions 29a, 29b connected to the inner cylinder portions 14a, 14b on the radially outer side and the outer cylinder portions 18a, 18b on the radially outer side respectively is improved. Therefore, it is possible to improve the rigidity against displacement of the outer body 3a and the inner body 2a in the direction away from each other. Furthermore, since the rigidity of the center bridges 6a, 6b in the circumferential direction can be improved, it is also possible to improve the rigidity of the caliper 1a against the relative displacement of the inner body 2a and the outer body 3a in the circumferential direction.

Reason for Suppressing Weight Increase

In the case of the present embodiment, of the belt-shaped rib 12 contributing to the improvement of the rigidity as described above, the outer side rib 32 covers the radially inner side portions of the bottom portions of the outer cylinder portions 18a, 18b on the radially outer side and the radially outer side portions of the bottom portions of the outer cylinder portions 19a, 19b on the radially inner side from the axially outer side so as to traverse the same in the circumferential direction, and the outer side rib 32 does not cover the whole bottom portions of the outer cylinder portions 18a, 18b on the radially outer side and the whole bottom portions of the outer cylinder portions 19a, 19b on the radially inner side (not increased in thickness).

Similarly, the inner side rib 33 covers the radially inner side portions of the bottom portions of the inner cylinder portions 14a, 14b on the radially outer side and the radially outer side portions of the bottom portions of the inner cylinder portions 15a, 15b on the radially inner side from the axially inner side so as to traverse the same in the circumferential direction, and the inner side rib 33 does not cover the whole bottom portions of the inner cylinder portions 14a, 14b on the radially outer side and the whole bottom portions of the inner cylinder portions 15a, 15b on the radially inner side (not increased in thickness).

Therefore, in this embodiment, it is possible to effectively improve the rigidity while minimizing an increase in the weight of the caliper 1a.

Further, in the case of the present embodiment, since the connecting portions 30a, 30b are disposed at the positions as described above, the inner pad 8 and the outer pad 9 incorporated in the caliper 1a are not covered from the radially outer side by the connecting portions 30a, 30b. Therefore, the cooling performance of the inner pad 8 and the outer pad 9 can be ensured. Further, it is possible to assemble a wear indicator to the inner pad 8 and the outer pad 9 from the radially outer side through a portion between the center bridges 6a, 6b and the connecting portions 30a, 30b which are adjacent to each other in the circumferential direction. Therefore, the inner pad and the outer pad can be commonly used.

Here, the features of the embodiment of the caliper for an opposed-piston type disc brake according to the present invention will be briefly summarized.

[1] A caliper (1a) for an opposed-piston type disc brake including:

an inner body (2a) which is disposed on an axially inner side of a rotor (11) and includes two or more inner cylinder portions (14a, 14b) on a radially outer side and two or more inner cylinder portions (15a, 15b) on a radially inner side in two stages in a radial direction;

an outer body (3a) which is disposed on an axially outer side of the rotor (11) and includes two or more outer cylinder portions (18a, 18b) on the radially outer side and two or more outer cylinder portions (19a, 19b) on the radially inner side in two stages in the radial direction;

a rotation-in side connecting portion (4a) and a rotation-out side connecting portion (5a) which are disposed radially outward than an outer circumferential edge of the rotor (11), and connect both circumferential end portions of the inner body (2a) and both circumferential end portions of the outer body (3a); and two or more center bridges (6a, 6b) which are disposed between the rotation-in side connecting portion (4a) and the rotation-out side connecting portion (5a) in a circumferential direction and radially outward than the outer circumferential edge of the rotor (11), and connect a circumferentially intermediate portion of the inner body (2a) and a circumferentially intermediate portion of the outer body (3a), wherein a belt-shaped rib extending in the circumferential direction is provided at least on an axially outer side surface of the outer body (3a), and the belt-shaped rib (12) covers radially inner side portions of bottom portions of the outer cylinder portions (18a, 18b) on the radially outer side and radially outer side portions of bottom portions of the outer cylinder portions (19a, 19b) on the radially inner side from an axially outer side so as to traverse the same in the circumferential direction, and wherein axially outer end portions of the center bridges (6a, 6b) are connected to the outer cylinder portions (18a, 18b) on the radially outer side, and the center bridges (6a, 6b) which are adjacent to each other in the circumferential direction are connected to each other by connecting portions (30a, 30b) located on a side farther from the rotor (11) in an axial direction of the rotor (11) than tip end portions of pistons (16a, 16b; 17a, 17b; 20a, 20b; 21a, 21b) incorporated in cylinder portions (14a, 14b; 15a, 15b; 18a, 18b; 19a, 19b) on the radially outer side and the radially inner side which are provided in at least one of the inner body (2a) and the outer body (3a).

[2] The caliper (1a) for an opposed-piston type disc brake according to [1], wherein the center bridges (6a, 6b) are disposed at portions between the outer cylinder portions (18a, 18b) on the radially outer side adjacent to each other in the circumferential direction respectively. [3] The caliper (1a) for an opposed-piston type disc brake according to [2], wherein a penetration hole (31a, 31b) is provided at a portion surrounded by the center bridges (6a, 6b) adjacent to each other in the circumferential direction, the connecting portions (30a, 30b) connecting these center bridges (6a, 6b), and one of the bodies (inner body 2a, outer body 3a).

[4] The caliper (1a) for an opposed-piston type disc brake according to any one of [1] to [3], wherein the connecting portions (30a, 30b) are located axially outward than a circumferentially intermediate portion of an axially inner side surface where the outer cylinder portions (18a, 18b; 19a, 19b) on the radially outer side and on the radially inner side of the outer body (3a) are open.

[5] The caliper (1a) for an opposed-piston type disc brake according to any one of [1] to [4], wherein both side portions of the belt-shaped rib (12) in a longitudinal direction of the belt-shaped rib (12) are extended along the axial direction of the rotor (11) on a rotation-in side lateral surface of the rotation-in side connecting portion (4a) and a rotation-out side lateral surface of the rotation-out side connecting portion (5b) respectively, and are continuous with an axially inner side surface of the inner body (2a).

[6] The caliper (1a) for an opposed-piston type disc brake according to [5], wherein a pair of attachment portions (13a, 13b) for fixing to a vehicle body are provided in the inner body (2a) in a state of being separated from each other in the circumferential direction, and the belt-shaped rib (12) is provided in a state of being continuous with the attachment portions (13a, 13b).

Incidentally, the present invention is not limited to the above-described embodiment, and may be appropriately modified, improved or the like. In addition, materials, shapes, dimensions, numerals, disposition locations or the like of each constituent element in the above-described embodiment are optional as long as the object of the present invention can be achieved, and the present invention is not limited thereto.

The present application is based on a Japanese Patent Application (JP-A-2016-239006) filed on Dec. 9, 2016, contents of which are incorporated herein as reference.

INDUSTRIAL APPLICABILITY

In the case of performing the present invention, the caliper for an opposed-piston type disc brake may be a monocoque structure (integrated structure) integrally formed of a material such as an aluminum alloy, or a structure in which an inner side member and an outer side member are connected by bolts.

The number of the inner cylinders and the outer cylinders is not limited to four as described in the above embodiment, but may be five or more. Further, in the case of performing the present invention, the support structure of the inner pad and the outer pad is not limited to the structure of the embodiment, and various conventionally known structures can be adopted.

DESCRIPTION OF REFERENCE NUMERALS 1, 1a caliper
2, 2a inner body
3, 3a outer body
4, 4a rotation-in side connecting portion
5, 5a rotation-out side connecting portion
6, 6a, 6b center bridge
7 inner cylinder
8 inner pad
9 outer pad
10a, 10b pad spring
11 rotor
12 belt-shaped rib
13a, 13b attachment portion
14a, 14b inner cylinder portion on radially outer side
15a, 15b inner cylinder portion on radially inner side
16a, 16b inner piston on radially outer side
17a, 17b inner piston on radially inner side
18a, 18b outer cylinder portion on radially outer side
19a, 19b outer cylinder portion on radially inner side
20a, 20b outer piston on radially outer side
21a, 21b outer piston on radially inner side
22a, 22b projection portion
23a, 23b pad pin
24a, 24b guide wall portion
25 opening portion
26 torque receiving portion
27a, 27b straight portion
28a, 28b inner side bent portion
29a, 29b outer side bent portion
30a, 30b connecting portion
31a, 31b penetration hole
32 outer side rib
33 inner side rib
34 rotation-in side rib
35 rotation-out side rib
36 lining
37 back plate
38 protrusion portion 6p 39 torque transmission surface
41a, 41b pressing portion
42 held portion
43a, 43b bleeder screw
44 communication pipe
45 oil supply port

The invention claimed is:

1. A caliper for an opposed-piston disc brake, the caliper comprising:

an inner body which is disposed on an axially inner side of a rotor and includes two or more inner cylinder portions on a radially outer side and two or more inner cylinder portions on a radially inner side in two stages in a radial direction of the rotor;

an outer body which is disposed on an axially outer side of the rotor and includes two or more outer cylinder portions on the radially outer side and two or more outer cylinder portions on the radially inner side in two stages in the radial direction;

a rotation-in side connecting portion and a rotation-out side connecting portion which are disposed at an outer side in the radial direction than an outer circumferential edge of the rotor, and connect both circumferential end portions of the inner body and both circumferential end portions of the outer body; and two or more center bridges which are disposed between the rotation-in side connecting portion and the rotation-out side connecting portion in a circumferential direction and are disposed at the outer side in the radial direction than the outer circumferential edge of the rotor, and connect a circumferentially intermediate portion of the inner body and a circumferentially intermediate portion of the outer body, wherein a belt-shaped rib extending in the circumferential direction is provided at least on an axially outer side surface of the outer body, and the belt-shaped rib covers radially inner side portions of bottom portions of the outer cylinder portions on the radially outer side and radially outer side portions of bottom portions of the outer cylinder portions on the radially inner side from an axially outer side so as to traverse the same in the circumferential direction, wherein axially outer end portions of the center bridges are connected to the outer cylinder portions on the radially outer side, and the center bridges which are adjacent to each other in the circumferential direction are connected to each other by first and second connecting portions, the first connecting portion is located on a side farther from the rotor in an axial direction of the rotor than tip end portions of inner pistons incorporated in inner cylinder portions on the radially outer side and the radially inner side which are provided in the inner body, and the second connection portion is located on the side farther from the rotor in the axial direction of the rotor than tip end portions of outer pistons incorporated in outer cylinder portions on the radially outer side and the radially inner side which are provided in the outer body, wherein a first penetration hole is provided at a portion surrounded by the first connecting portion and the center bridges adjacent to each other in the circumferential direction, the first penetration hole located between the inner cylinder portions on the radially outer side in the circumferential direction, the first connecting portion connecting these center bridges and the inner body, and wherein a second penetration hole is provided at a portion surrounded by the second connecting portion and the center bridges and adjacent to each other in the circumferential direction, the second penetration hole located between the outer cylinder portions on the radially outer side in the circumferential direction, and the second connecting portion connecting these center bridges and the outer body.

2. The caliper according to claim 1, wherein the center bridges are disposed at portions between the outer cylinder portions on the radially outer side adjacent to each other in the circumferential direction, respectively.

3. The caliper according to claim 1, wherein the first and second connecting portions are located at an outer side in an axial direction of the rotor than a circumferentially intermediate portion of an axially inner side surface where each of the outer cylinder portions on the radially outer side and on the radially inner side of the outer body are open.

4. The caliper according to claim 1, wherein both side portions of the belt-shaped rib in a longitudinal direction of the belt-shaped rib are extended along the axial direction of the rotor on a rotation-in side lateral surface of the rotation-in side connecting portion and a rotation-out side lateral surface of the rotation-out side connecting portion, respectively, and are continuous with an axially inner side surface of the inner body.

5. The caliper according to claim 4, wherein a pair of attachment portions for fixing to a vehicle body are provided in the inner body in a state of being separated from each other in the circumferential direction, and the belt-shaped rib is provided in a state of being continuous with the attachment portions.

* * * * *